United States Patent [19]
Thimon et al.

[11] Patent Number: 5,310,106
[45] Date of Patent: May 10, 1994

[54] APPARATUS FOR OBTAINING DIFFERENTIAL TANGENTIAL VARIABLE SPEEDS AT DIFFERENT POINTS OF A DEFORMABLE FILM

[75] Inventors: Hubert Thimon; Paul Jacquier, both of Aix les Bains, France

[73] Assignee: Societe Des Etablissements Thimon, Paris, France

[21] Appl. No.: 80,988

[22] Filed: Jun. 22, 1993

Related U.S. Application Data

[60] Continuation of Ser. No. 671,115, Mar. 15, 1991, abandoned, which is a division of Ser. No. 488,404, Feb. 28, 1990, Pat. No. 5,000,364, which is a continuation of Ser. No. 372,103, Jun. 28, 1989, abandoned, which is a continuation of Ser. No. 62,315, Jun. 8, 1987, abandoned, which is a division of Ser. No. 546,034, Oct. 27, 1983, abandoned.

[51] Int. Cl.$^5$ ............................................. B65H 20/02
[52] U.S. Cl. .................................... 226/175; 226/189; 226/191
[58] Field of Search ................... 226/175, 178, 27, 29, 226/44, 190, 191

[56] References Cited

U.S. PATENT DOCUMENTS

| | | | |
|---|---|---|---|
| 1,402,726 | 1/1922 | Wegner | 226/175 |
| 2,701,717 | 2/1955 | Morrill | 226/191 X |
| 5,000,364 | 3/1991 | Thimon et al. | 226/175 |

OTHER PUBLICATIONS

IBM Tech. Dis. Bull., "Varied Rate Web Feed", Gibson, vol. 10, No. 12; May, 1968.

*Primary Examiner*—Joseph J. Hail, III
*Assistant Examiner*—Paul T. Bowen
*Attorney, Agent, or Firm*—Kenyon & Kenyon

[57] ABSTRACT

This device is designed such that the differential tangential speeds V are variable at different points of a deformable flat film (1) or plate that moves along at least one drawing roller (3) rotating about an axis XX, said film (1) or plate moving in a direction perpendicular to the axis of rotation of the roller and resting on a generatrix $G_N$ of the roller. The roller (3) has a rotational speed N which is constant with time, while the distance $G_NC_1$ from the supporting generatrix $G_N$ of the film to the axis $C_1$ of rotation of the roller is variable with time. The invention is applicable to the drawing of plastic films.

3 Claims, 4 Drawing Sheets

APPARATUS FOR OBTAINING DIFFERENTIAL TANGENTIAL VARIABLE SPEEDS AT DIFFERENT POINTS OF A DEFORMABLE FILM

This is a continuation of now abandoned application Ser. No. 07/671,115, filed Mar. 15, 1991, which is a divisional of application Ser. No. 07/488,404, filed Feb. 28, 1990, now U.S. Pat. No. 5,000,364, which is a continuation of now abandoned application Ser. No. 07/372,103, filed Jun. 28, 1989, which is a continuation of now abandoned application Ser. No. 07/062,315, filed Jun. 8, 1987, which is a divisional of now abandoned application Ser. No. 06/546,034, filed Oct. 27, 1983.

The invention relates to an apparatus for obtaining differential variable speeds at various points of a flat film, which is more particularly elastically or plastically deformable.

In numerous industries, particularly in the textile and metallurgical industries, it is common practice and necessary to draw flat stock with the object of thinning down or calendering these products. Sometimes it is necessary to prestress plastic, metallurgical or textile products. Finally, in the packing industry, plastic films are drawn prior to placing them around palletized loads and causing them to retract naturally or not.

In general, to carry out these operations, it is necessary to obtain different speeds between two different points of the film. To do this, it is common practice to use two rollers turning about parallel axes at different rotational speeds. Thus, in general, the rotational speed of the downstream roller is higher than that of the upstream roller. In particular, the angular speeds of the rotating rollers are varied by mechanical, electronic, hydraulic means and by gear boxes, gearings, etc. However, the devices of the prior art do not permit variation of the differential speed ratio by a value very much higher than 1, e.g., up to 3. Moreover, when baderoling pallets in the starting phase, it is not possible to obtain a differential speed ratio equal to 1 without using coupling devices The primary object of the invention is to overcome these drawbacks.

The invention relates to an apparatus for obtaining differential tangential variable speeds at different points of a deformable flat film or plate moving along at least one drawing roller rotating about an axis, said film or plate moving in a direction perpendicular to the axis of rotation of the roller and resting on a generatrix of the drawing roller.

This apparatus is characterized by the fact that the roller has a rotational speed which is constant with time, whereas the distance from the supporting generatrix of the film to the axis of rotation of the roller is variable with time.

According to a first embodiment of the invention, the drawing roller is formed by a plurality of contiguous generatrices whose distance to the axis of rotation increases continuously with time from the downstream generatrix from which issues the drawn film.

According to a second embodiment, the drawing roller is a deformable cylinder, in particular a cylinder of revolution having an axis of rotation which is displaced in relation to the axis of revolution, the distance between the contiguous generatrices increasing continuously with time from the upstream generatrix reached by the undrawn film to the downstream generatrix from which issues the drawn film.

The film rests on the generatrix by means of at least one pressure member that exerts pressure on the roller, in particular a supporting roller, said member moving as it rotates about its axis dependent upon the displacement of the supporting generatrix, and the film being placed between the supporting member and the roller.

The ratio of the initial distance $R_o$ from the upstream generatrix to the axis of rotation to the final distance $R_1$ from the downstream generatrix to the axis of rotation is adjustable.

Finally, according to a third embodiment, the film is carried along by the rotation of two circular-cylinder rollers having a circular base and parallel axes of rotation, the upstream radius $R_o$ and the downstream radius $R_1$ being variable with time. Furthermore, the drawing ratio, more particularly the ratio of the differential tangential speed $V_1$ at a point of the film downstream, following drawing, to the differential tangential speed $V_o$ at a point of the film upstream, prior to drawing, is proportional to the ratio of the radius $R_1$ of the downstream roller to the radius $R_o$ of the upstream roller.

It will be understood that the apparatus embodying the principles of the invention has significant advantages over devices of the prior art. Indeed, it is easy to adjust the drawing either by changing the position of the axis of rotation relative to the axis of revolution; this modifies the distance between the generatrix on which the film rests and the axis of rotation of the roller, or by modifying the radii of the rollers relative to one another. In addition, several rollers, as required, can be utilized which, by varying their radii, enables one to obtain differential variable speeds.

For a more complete understanding of the present invention, reference is now made to the following description of illustrative embodiments presented hereinbelow in connection with the accompanying drawings, in which:

FIG. 3 is a perspective view of a third embodiment;

FIGS. 4A and 4B show the variation of the radii of the rollers for, respectively, minimum drawing and maximum drawing.

FIG. 5 shows a first embodiment of a roller;

FIG. 6 shows a second embodiment of a roller;

The apparatus of the invention enables one to obtain differential tangential variable speeds at different points of a deformable flat film or plate, more particularly an elastically or plastically deformable film. It is well known that elastic deformation is reversible and that the film, when no longer drawn, resumes its initial position, whereas plastic deformation is partly irreversible and the film, when no longer drawn, has a final length which is greater than its initial length.

Tangential differential speed is the speed of the film moving along at least one roller or carried along by the rotation of at least one roller rotating about its axis, the film moving in a direction perpendicular to the axis of rotation of the roller and resting on a generatrix of the roller.

According to the invention, the roller has a speed of rotation N which is constant with time, while the distance R from the supporting generatrix or surface section of the axis for rotation of the roller is variable with time.

Figure 1:
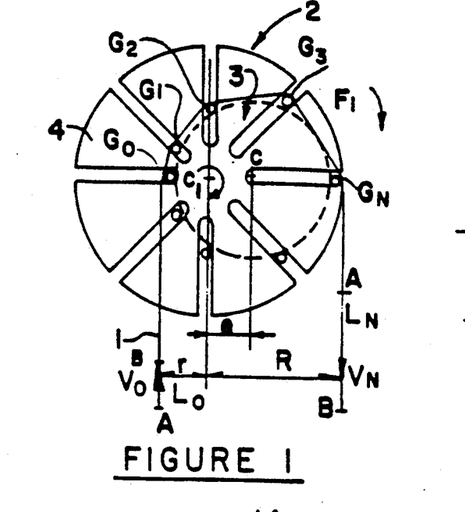
FIG. 1 is a schematic view of a first embodiment of the invention.

FIG. 1 depicts a first embodiment of the invention. A film 1 arrives upstream in drawing apparatus 2 and issues downstream therefrom Since the tangential speed of film 1 upstream is $V_o$, the tangential speed of film 1 downstream equals $V_N$. Apparatus 2 enables one to obtain tangential differential speeds $V_N$, which are variable at different points of film 1. The latter is flat and in FIG. 1 it is shown perpendicular to the plane of the figure. It is a film which is elastically or plastically deformable and is preferably made from synthetic material. The length $L_o$ between two points AB of the film upstream is less than the length $L_N$ between the same points AB of film 1 downstream.

According to the invention, apparatus 2 permits the drawing of film 1, i.e., the segment AB with a length L that gradually attains the length LN (FIG. 1).

This first embodiment comprises a roller 3 formed by a plurality of contiguous generatrices $G_0, \ldots, G_N$. Generatrices G are caused to rotate about an axis C by a drive mechanism 4, preferably at least two spiders formed by flat circular sections placed at each end of generatrices $G_N$. The center of rotation $C_1$, through which passes the axis of rotation of the spider, is displaced in relation to the center of rotation C of drawing roller 3 by a distance e. The direction of rotation of drive mechanism 4 is the same as that of drawing roller 3. Film 1 is carried along by the rotation of at least one roller 3 turning about an axis of rotation C, or center of rotation of the spiders 4, at right angles to the plane of the figure. Film 1 moves in a direction perpendicular to the axis of rotation of drawing roller 3 and rests on a generatrix $G_N$ of roller 3 at instant $t_N$. Thus, at instant $t_o$, film 1 bears on generatrix $G_O$, its speed is $V_o$, at instant $t_1 = t_o + \Delta t$, film 1 rests on generatrix $G_1$, its speed is $V_1 = V_o + \Delta V_o$, at instant $t_N$ the film rests on generatrix $G_N$, its speed $V_N = V + \Sigma \Delta V_{n-1}$. Preferably the speed increments $\Delta V_{N-1}$ are constant, but they may also vary. Drawing roller 3 rotates in the direction of arrow $F_1$ and has an angular speed of rotation N which is constant with time, while the distance from supporting generatrix $G_N$ to the axis of rotation of the drawing roller C, or center of rotation of the spiders 4, varies. Preferably, the distances $C_1 G_o \ldots, C_1 G_N$ are such that $C_1 G_O < \ldots < C_1 G_N$ and the distance from the axis of rotation $C_1$ of drive mechanism 4 to generatrix $G_O$ downstream is less than the distance from the axis of rotation to generatrix $G_N$ downstream. This distance $G_N C_1$ increases continuously during the interval from upstream to downstream. The initial distance $G_O C_1$ upstream equals r, while the final downstream distance equals R The distance e from the center of rotation C of drawing roller 3 to the center of rotation $C_1$ of drive mechanism 4 is adjustable; this permits adjustment of the final tangential speed $V_N$ in relation to the initial tangential speed $V_o$ and, thereby, the adjustment of the drawing ratio $$\frac{V_N}{V_o}.$$

This drawing ratio can increase up to 2 or 3, at any rate it is much higher than 1 and can also be adjusted to be less than 1.

The drawing ratio can be made such as to equal 1 when drawing a plastic film that is utilized for the banderoling of pallets. This drawing ratio equalling 1 is necessary at the start of the banderoling, since the film shall not be drawn. In this case, the distance $CC_1$ is zero. Thus, by displacing the center C in relation to the center $C_1$ the invention makes it possible to gradually adjust the drawing ratio.

According to a second embodiment of the apparatus of the invention (FIG. 2), the drawing roller is a cylinder of revolution 5, preferably having a circular base, whose axis of rotation of the center $C_2$ is displaced relative to the axis of revolution of the center $C_3$. The drawing cylinder is deformable and is preferably made from elastomeric material. Thus, the distance between the contiguous generatrices $G_O, G_1, \ldots, G_N$ increases continuously during the rotation (direction of arrow $F_2$) when the center of rotation $C_2$ is displaced on the upstream side in relation to the center of revolution $C_3$.

Figure 2:
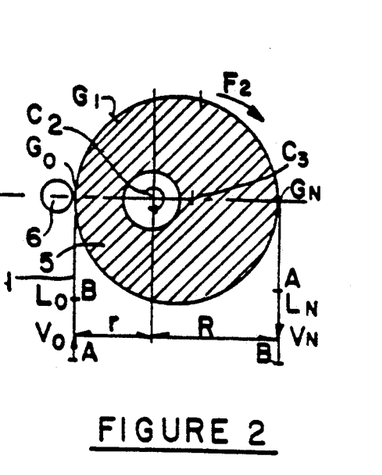
FIG. 2 is a schematic view of a second embodiment.

Film 1 rests on generatrix $G_N$ at an instant $t_N$ and a loose pulley 6 causes the deformation of deformable supporting cylinder 5 which moves as it rotates about the center $C_3$. The film is introduced upstream on the side where the distance $r = C_2 G_O$ from the center of rotation $C_2$ to the generatrix $G_O$ is the shortest, and issues downstream on the side where the distance $R = C_2 G_N$ from the center of rotation $C_2$ to generatrix $G_N$ is the longest.

By adjusting the distance $C_2 C_3$ with the aid of pulley 6, the drawing ratio $V_n/V_o$, which may equal 1 when $C_2$ merges with $C_3$, is adjusted.

According to a third embodiment of the invention (FIGS. 3-8), the film moves along two circular-cylindrical rollers 7, 8 having a circular base and parallel rotating axles XX, YY, the radius $R_o$ of upstream cylinder 7 and the radius $R_1$ of downstream cylinder 8 being variable with time. Film 1 moves in a direction perpendicular to axles XX, YY.

Figures 3, 4, 4B, 5, 6:
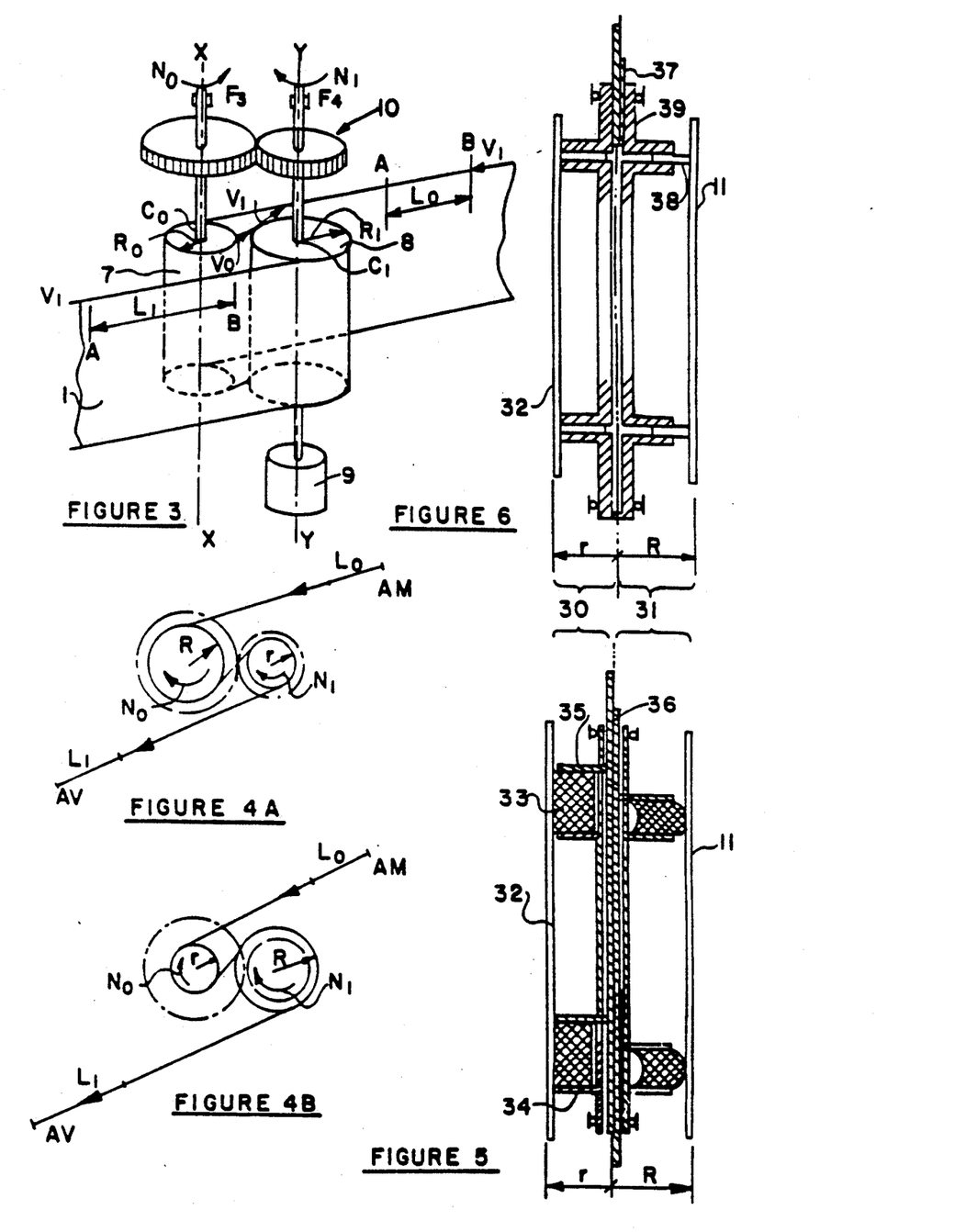

According to the invention, tangential speed $V_o$ of film 1 upstream is different from the tangential speed $V_1$ of film 1 downstream.

Film 1, moving at speed $V_1$, can drive the set of rollers 7 and 8. In a variation, film 1 is driven at speed $V_1$ by the roller 8 driven by a motor 9.

According to the invention, rollers 7, 8 are rotated in such a way that the ratio K of the speed of rotation $N_1$ of cylinder 8 to the speed of rotation $N_o$ of cylinder 7 is constant. They have opposed directions of rotation, cylinder 7 working in the direction of arrow $F_3$ and cylinder 8 rotating in the opposite direction (arrow $F_4$).

Therefore, if E is the drawing ratio of the film, L is the length of a segment AB downstream, and $L_o$ is the length of the segment AB of film 1 upstream, the following equation is valid:

$$E = \frac{L_1}{L_o}$$

At instant t, one has $L_o = V_o t$ and $L_1 = V_1 t$. Therefore $$\frac{L_1}{L_o} = E = \frac{V_1}{V_o}$$

However, the tangential speed equals the radius of the cylinder multiplied by the speed of rotation of the cylinder. Therefore,
$V_1 = N_1 R_1$
$V_o = N_o R_o$ $$E = \frac{V_1}{V_o} = \frac{N_1}{N_o} \cdot \frac{R_1}{R_o} = K \frac{R_1}{R_o}$$

According to the invention, $$K = \frac{N_1}{N_o}$$

By varying the radii $R_o$ and $R_1$ of upstream cylinder 7 and of downstream cylinder 8, one varies the ratio of the tangential speeds $V_o$ and $V_1$.

The distance from a generatrix $G_N$ to centers of rotation $C_o$ and $C_1$ thus varies with time, since radii $R_o$ and $R_1$ are variable.

If $R_o$ and $R_1$ vary between the limit values r and $\underline{R}$, when $R_1 = r$ and $R_o = R$, the drawing ratio $\bar{E}$ is at a minimum (FIG. 4A), whereas, if $R_1 = R$ and $R_o = r$. the drawing ratio E is at a maximum (FIG. 4B). Thus, E maxi = R/r and $$E \text{ mini} = \frac{r}{R}, \frac{E \text{ maxi}}{E \text{ mini}} = \frac{R^2}{r^2}$$

If it is desired to vary the drawing ratio from 0 to 100%, then $$\frac{E \text{ maxi}}{E \text{ mini}} = 2 \text{ and } R = r\sqrt{2}$$

R = ±113 mm, for example
r = ±80 mm
The average radius is ±97 mm.
If it is desired to vary the drawing from 0 to 200%, then $$\frac{E \text{ maxi}}{E \text{ mini}} = 3$$

r = ±70 mm, for example
R = ±123 mm
The average radius is ±97 mm.

If a drawing ratio E equal to 1 is desired, $k(N_1/N_o)$ must in the first case equal ±1.4, and in the second case it must equal ±1.7. The ratios K of the speeds of rotation are adjusted by means of a gearing 10.

According to an embodiment of the invention illustrated in FIGS. 7A, 7B, 7C and 7D, the apparatus for the variable predrawing or drawing comprises two drawing rollers 7 and 8 consisting of a plurality of longitudinal curved portions 11 forming the cylindrical surface of the roller. The two rotating axles XX, YY of the rollers are oriented in a relationship parallel to each other.

The function of guide members 12 for guiding curved portions 11 of rotating axles XX and YY into radial translation is to move them away or bring them closer together. The function of drive mechanisms 13 for rotating the curved portions 11 is to pivot them about axles XX and YY and, finally, the function of control units 14 is to activate guide members 12.

Preferably, the drive mechanisms 13 for rotating the curved portions 11 consist of hubs 15 which enable the latter to rotate about axles XX or YY, which are fluted axles. These fluted axles pivot on bearings 16.

Guide members 12 for guiding the curved portions 11 in such a way as to slide in radial translation consist of ramps 17 which rest in grooves 18 provided in hubs 15. Each drawing roller 11 has at least two hubs 15. Hubs 15 of a cylinder 7 slide simultaneously along a respective fluted axle XX or YY.

Ramps 17 are capable of sliding radially in grooves 18. Thus, the radius of drawing rollers 7 and 8 can vary by sliding ramps 17 radially in grooves 18 and, simultaneously, by sliding hubs 15 in an axial direction.

Each cylindrical roller 7, 8 has at least one flange 19 to ensure the end guidance of portions 11. Stops 20 can slide radially in relation to the respective flange 19.

The apparatus also includes control units 14 to activate the guide members 12 for causing portions 11 to slide in radial and axial translation. Control units 14 consist of a double fork 21 pivoting about an axis 22, which is oriented perpendicular to rotating axles XX, YY of rollers 7, 8. Double fork 21 acts by means of a supporting rims 23, each being mounted to one end of rotating axle XX, YY of the rollers. Each supporting rim 23' is mounted to the respective axle XX or YY by a thrust ball bearing 23.

Thus, when double fork 21 leans on the side of upstream roller 7 (FIG. 7A), it acts on stop 23, causing hubs 15 of upstream roller 7 to slide axially. Hubs 15 are displaced to the end of axle XX which does not have the stop 23. placed to the end of axle XX which does not have the stop 23. Hubs 15, as they move, compress a return spring 24 mounted over the axle XX. Portions 11 and ramps 17 lie flat on the sliding hubs 15 and are supported by circumferential springs 25 located on each level of ramps 17.

Figure 7A:
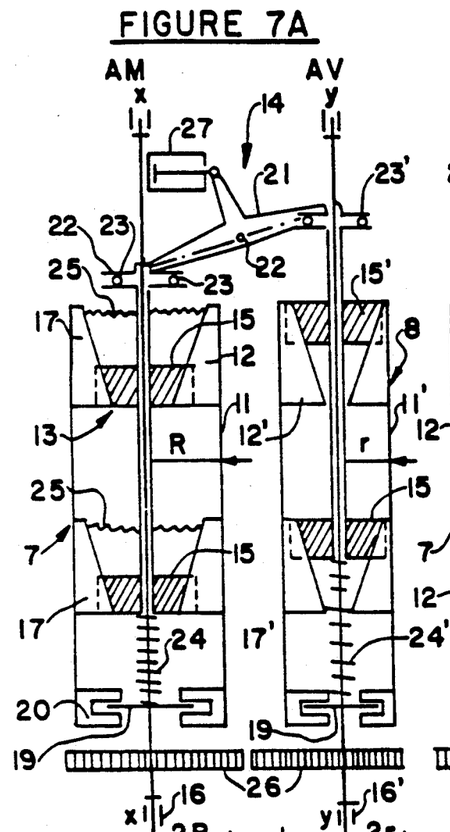
FIG. 7A and 7B show a first variation of the third embodiment with minimum drawing (7A) and maximum drawing (7B)

Hubs 15, as they move along axle XX, push portions 11 radially outwardly, thus ensuring the increase of the radius of roller 7, which assumes the value R.

By contrast, fork 21 is connected at its other end on the side of downstream roller 8, wherein the hubs 15 are in a position opposite to the hubs 15 of upstream roller 7. Return spring 24 urges the sliding hubs 15 and the control units 14 to the position corresponding to the minimum value of the radius of downstream roller 8, which assumes the value r.

Figure 7B:
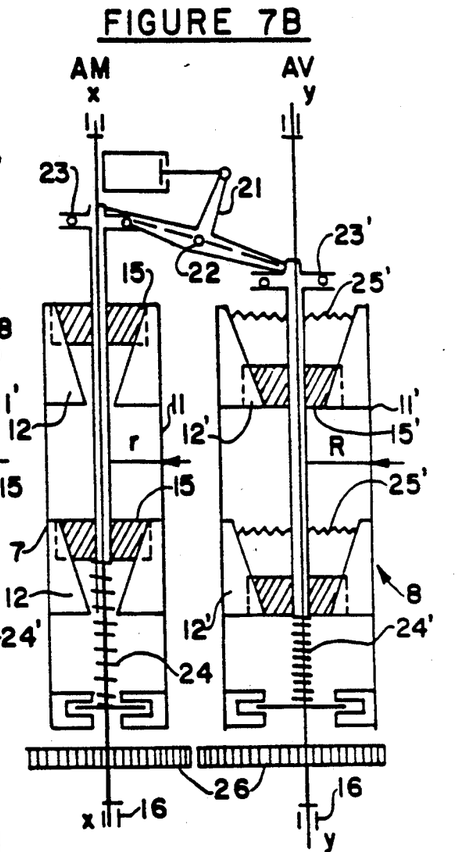
Figure 7C:
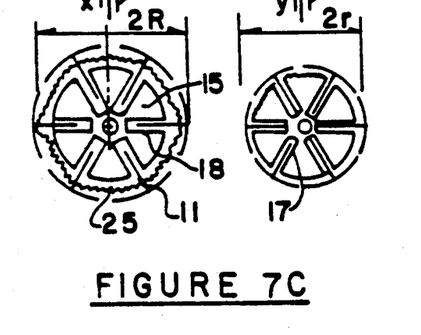
FIGS. 7C and 7D are top plan views of, on one side, a portion of the rollers and, on the other side, the means controlling the expansion or the contraction of the rollers.
Figure 7D:
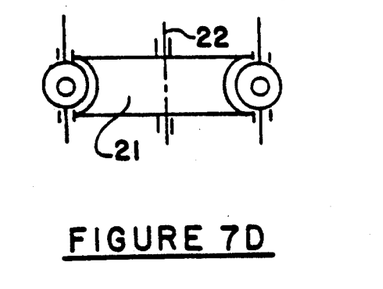

Gearings 26 are mounted to the axles XX and YY and thus permit the adjustment of the rotational speed of upstream roller 7 in relation to the rotational speed of the downstream roller 8.

In FIG. 7A, there is a radius R upstream and a radius r downstream, the drawing ratio E thus being at a minimum.

By contrast, by rocking the fork 21 in the opposite direction (FIG. 7B) a radius r is obtained on the upstream roller 7 and a radius $\underline{R}$ on the downstream roller 8, the drawing ratio E thus being at a maximum.

The pivoting of fork 21 is controlled by a control unit 27. As shown, this unit can be a hydraulic, pneumatic or electric actuating cylinder or a manual nut-and-bolt system. Thus, there corresponds to each position of control unit 27 for controlling the fork 21 a value of the radii of rollers 7 and 8, i.e., a value of the drawing coefficient. Positions of control unit 27 can be controlled by electrical means on the basis of predetermined or programmed set values.

In another embodiment (FIGS. 8A and 8B) of the apparatus of the invention, gearing 26 is placed on the side of control units 14. Ramps 17 are integral with a shaft 18 concentrically mounted on the rotating axle XX. The axle XX has a stop 29 mounted on one end thereof. A spring 24 is seated on one end against the stop 29. Fork 21, as it swivels, compresses the spring 24 which in turns brings about the displacement of hubs 15 axially in the direction of arrow F4, i.e., in the direction of movement of fork 21. Ramps 27 in turn slide in grooves 18, which causes the downstream cylinder to expand. By contrast, upstream cylinder 8 is not compressed.

Figure 8A:
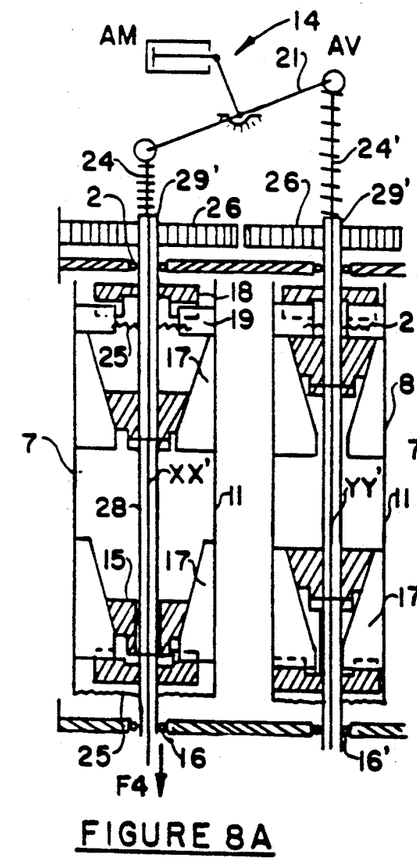
FIGS. 8A and 8B illustrate a second variation of this last embodiment of the invention with, respectively, minimum drawing and maximum drawing.
Figure 8B:
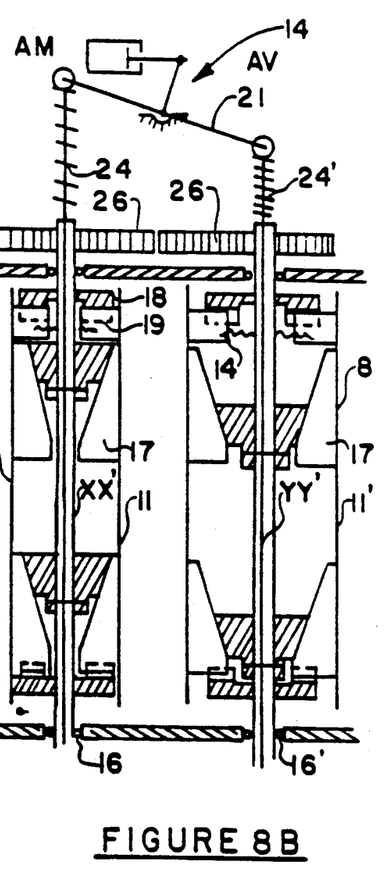

Preferably, portions 11 have on the outer surface an adhesion-promoting lining.

FIGS. 5 and 6 show other forms of construction of the rollers. On the left side of each figure, there is provided a half-roller 30 with a smaller radius and on the right side a half-roller 31 with a larger radius.

In FIG. 5, half-roller 30, like half-roller 31, consists of portions 32 that are integral with radial compressible elements 33. Preferably, they are made from elastomeric material. These radial elements 33 are located between radial fixed partitions 34 and radial movable partitions 35 that are integral with a shaft 36 capable of sliding axially. When shaft 36 is moved axially, movable partitions 35 move closer to fixed partitions 34, the elastomeric element is compressed axially and deformed radially as it urges portion 32 radially outwardly. The radius of the halt roller thus increases. When movable partitions 35 are moved away from fixed partitions 34, the elastomeric element 33 returns to its initial form. Preferably, the elastomeric elements are placed at each end of portions 11. In FIG. 6 portions 11 are displaced by means of a hydraulic device. The displacement of piston shaft 37 brings about the displacement of support 38 of portion 11, with the hydraulic liquid transmitting the pressure between piston shaft 37 and support 38.

The hydraulic liquid is located within the chamber formed by hollow shaft 39, with shaft 37 sliding axially and support 38 sliding radially.

In certain applications, the devices described hereinabove, particularly in FIGS. 1, 5, 6, 7A–7D, 8A and 8B, have the disadvantage that the portions strike against the tensely stretched film, thereby producing a noise due to the repeated blows of the portions or metal bars on the taut film.

Furthermore, the drawn film undergoes a transverse shrinkage, that is to say, the final width of the drawn film is smaller than its initial length. This is a drawback for obtaining the good quality of banderoling required in the packing industry.

Moreover, the portions forming the cylinders of revolution, which consist of metal bars, can cause the taut film to be torn because of the metal edges that can be more or less cutting.

In addition, the portions or metal drawing bars are returned by return springs whose purpose is to give a smaller radius to the drawing cylinder, if the latter was previously provided with a larger radius. Now, these return springs are placed within the drawing cylinders made up of the various portions, and the practical construction of these devices is complex.

Therefore, the invention is also directed toward remedying these drawbacks by providing the rollers with external elastic means for returning the portions to the axis of revolution.

Preferably, these external return devices consist of at least one elastic band placed around and within the portions.

For example, the elastic bands are circular rings that are spaced a distance from one another. Preferably, the rings are made integral with the portions, e.g., by adhesive bonding.

The fact that external elastic return means are placed on the portions permits elimination of the return springs which cause the decrease of the cylinder radius. Moreover, the elastic bands considerably reduce the noise created by the portions or metal bars striking against the taut film. In addition, the elastic devices also constitute means for protecting the film, because they cover the cutting edges of the portions or metal bars, thus preventing the drawn film from contacting these portions or metal bars.

Figure 9:
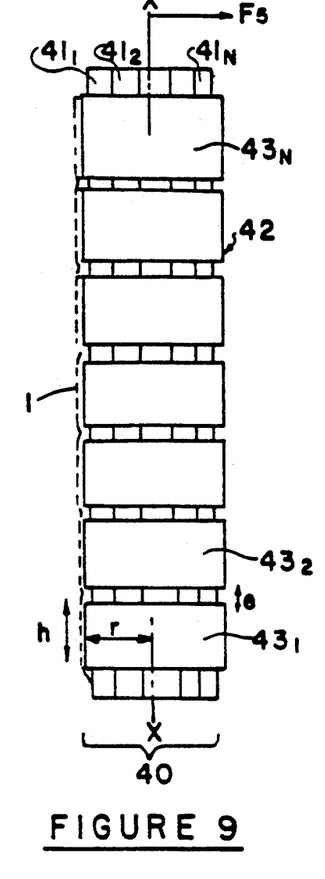
FIG. 9 is a side view of another variation of the roller of the invention.

Roller 40 depicted in FIG. 9 may either be a roller of the type shown at 3 of FIG. 1 or of the type illustrated at 7 and 8 of FIGS. 7A–7D, 8A–8B, or 30, 31 depicted in FIGS. 5 and 6.

The roller 40 includes a plurality of longitudinal portions $41_1$, $41_2$, $41_N$, which form the cylindrical surface of roller 40.

According to the invention, roller 40 is provided with external means 42 for returning the portions 41 to the X—X axis.

Therefore, when portions $41_1$, $41_2$, 41N are moved with the aid of the separating means described hereinabove in order to increase the radius $R_o$ or radius $r_1$, the external elastic devices 42 return the portions $41_1$, $41_2$, $41_N$ to the X—X axis of the cylinder of revolution 40.

These external elastic means 42 consist of an elastic band placed around and outside of portions $41_1$, $41_2$, $41_N$.

According to a first embodiment of the invention shown in FIG. 9, the elastic band is made up of several circular rings $43_1$, $42_2$, $43_N$ of axles XX spaced a distance from one another. These circular rings With, e.g., a height $\underline{h}$, have a radius r which is substantially equal to the radius r of the drawing roller, i.e., radius r of bands $43_N$ is slightly smaller than the smallest radius the roller can have. Thus, bands $43_1$, $42_2$, $43_N$ keep portions $41_1$, $41_2$, $41_N$ substantially contiguous with each other when these bands $43_1$, $42_2$, $43_N$ are not drawn.

When portions $41_1$, $41_N$ are subjected to a radial displacement toward arrow F directed outwardly so as to separate portions $41_1$, $41_2$, $41_N$ from the axis of revolution XX of roller 40, the elastic bands $43_1$, $42_2$, $43_N$ are exposed to a radial force indicated by the arrow $F_5$ which causes the bands to have a radius that is larger than their initial radius, substantially equal to the radius desired for the drawing roller. The bands are thus subjected to a force $F_5$ that draws them.

When the means for separating portions $43_1$–$41_N$ are inactive, the bands are no longer subjected to force $F_5$ and, since they are elastic, they have a tendency to return to their initial shape and to take back their initial radius r and, thereby subjecting portions $41_1$, $41_2$, and $41_N$ to a force which is opposite to force $F_5$ in order to return them to their original position.

Preferably, circular rings $43_1$, $43_2$, $43_N$ are spaced a distance e from one another.

Preferably, the distance e between two successive rings $43_1$, $43_2$ is a few millimeters, e.g., more particularly about 2 to 3 mm.

Figure 10:
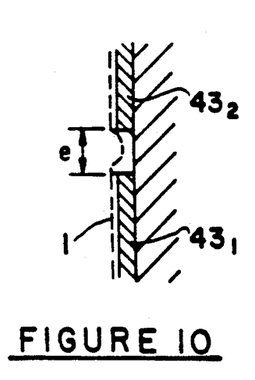
FIG. 10 is an enlarged view of a detail of the roller of FIG. 9.

FIG. 10 shows an enlarged view of two rings $43_1$, $43_2$ and film I which rests on these two rings. As can be seen, film 1 rests on rings $43_1$ and $42_2$, whereas it does not rest on the portions $41_1$–$41_N$ themselves between rings $43_1$, $42_2$, that is, when the film lies in the space formed between rings $43_1$ and $43_2$.

Figure 11:
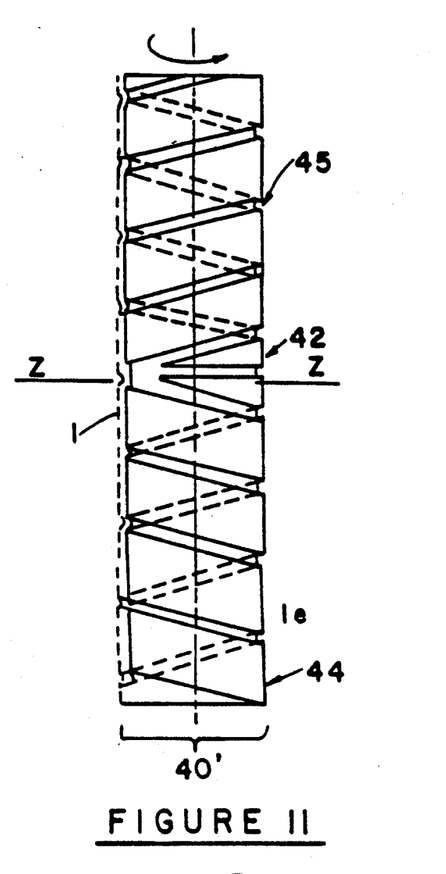
FIG. 11 is a side view of another variation similar to that depicted in FIG. 9.

FIG. 11 depicts another embodiment of the invention. The band forming the elastic means 42 is composed of 2 parts 44 and 45. The first part 45 is a band which is helically wound in one direction, while the second part is another band which is helically wound in the opposite direction.

The first part 44 is wound in the direction opposite to the direction of rotation of roller 40 while the second upper part is wound in the direction of rotation of roller 40, as indicated by the arrow in FIG. 11, while the second upper part 45 is wound in the direction of rotation of roller 40.

Likewise, the spires of bands 44 and 45 are not contiguous and they are spaced apart by a distance e. Preferably, this distance e measures a few millimeters and, more preferably, approximately 2 to 3 mm.

Figure 12:
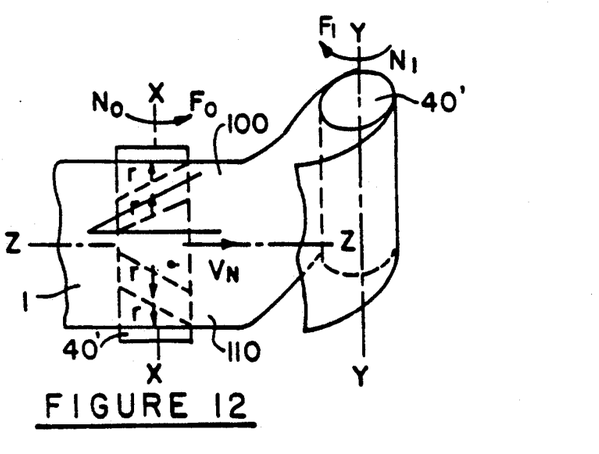
FIG. 12 is a schematic view of the operation of an apparatus of the invention equipped with rollers such as the roller of FIG. 11.

Therefore, the helical spires are not opposed and are symmetrically distributed relative to the longitudinal axis Z—Z of the film which is drawn. Thus, the direction of winding of the helices of parts 44 and 45 is such that the film is exposed to a component of reaction of the helical spires on the film, said component being directed to the external edge 100 and 110 of drawn film 1 (FIG. 12). Consequently, film 1 is subjected to transverse drawing in the direction of the components of reaction of the helical turns on the film (direction and sense of arrows r) and the film is then not subjected to transverse shrinkage as it is being drawn, or at least it is subjected to less transverse shrinkage than when it is drawn by rollers that do not have an elastic helical band. The plane of each spire is oriented at an acute angle $\alpha$ with respect to the direction of displacement $v_n$ of the drawn film. Preferably, $\alpha$ is less than 46°.

Furthermore, according to the invention, an advantage of the elastic means 42 is that the portions $41_1$, $41_N$, which are often metal bars, do not strike the film, since the elastic means are situated between the film and these metal bars. This reduces the noise produced by the apparatus.

In addition, since the film does not rest directly on portions $41_1$, $41_N$, it is less likely to be torn by their edges.

Finally, it is preferable that the circular rings $41_1$, $42_2$, $43_N$ or the helically wound bands 44, 45 be integral with portions $41_1$, $41_N$, e.g., that they be adhesively-bonded The rings and the helical bands are preferably made of a vulcanized sheet of rubber.

We claim:

1. An apparatus for stretching a deformable film comprising:
   first and second plate members rotatably mounted for rotation about a first axis and separated by a predetermined distance along the first axis, each first and second plate member including a plurality of channels spaced apart from each other and extending radially outward away from said first axis; and
   a plurality of first longitudinal members each being mounted on one end in a channel in the first plate member and mounted on the other end in a corresponding channel in the second plate member such that each longitudinal member may move radially in the respective channel, and such that, upon rotation of the first and second plate members about the first axis, the longitudinal members rotate about a second axis oriented substantially parallel to the first axis and displaced a predetermined distance from the first axis, so that a first longitudinal member separated from the first axis by a first distance and a first portion of the film supported thereon move at a tangential space which is less than the tangential speed of a second portion of the film supported on a second longitudinal member separated from the first axis by a distance greater than the first distance, thereby supporting and stretching the deformable film.

2. An apparatus according to claim 1 wherein the second axis is displaced such that the deformable film first contacts a first longitudinal member at a point which is closer to the first axis than the point at which the deformable film leaves that first longitudinal member.

3. An apparatus according to claim 1 further comprising at least one substantially cylindrical member substantially concentric with the second axis and mounted such that the first longitudinal members are supported by the substantially cylindrical member.

* * * * *

UNITED STATES PATENT AND TRADEMARK OFFICE
CERTIFICATE OF CORRECTION

PATENT NO. : 5,310,106
DATED : 10 May 1994
INVENTOR(S) : Thimon HUBERT et al.

It is certified that error appears in the above-indentified patent and that said Letters Patent is hereby corrected as shown below:

| Column | Line | |
|---|---|---|
| 3 | 19 | Change "tion of the axis for rotation" to --tion for the film to the axis of rotation--. |
| 3 | 48 | After "rotation C," delete --or center of-- |
| 3 | 49 | Delete "rotation of the spiders 4,". |
| 7 | 17 | After "mounted" change "on" to --to--. |
| 7 | 44 | Change "halt roller" to --half roller--. |
| 7 | 54 | After "by" insert --a--. |
| 8 | 42 | Change "41N" to --$41_N$--. |
| 8 | 52 | Change "$42_2$" to --$43_2$--. |

UNITED STATES PATENT AND TRADEMARK OFFICE
CERTIFICATE OF CORRECTION

PATENT NO. : 5,310,106
DATED : 10 May 1994
INVENTOR(S) : Thimon HUBERT et al.

It is certified that error appears in the above-indentified patent and that said Letters Patent is hereby corrected as shown below:

| Column | Line | |
|---|---|---|
| 8 | 53 | Change "With" to --with--. |
| 8 | 57 | Change "$42_2$" to --$43_2$--. |
| 8 | 59 | Change "$42_2$" to --$43_2$--. |
| 8 | 61 | Delete "toward arrow F directed outwardly". |
| 8 | 63 | Change "$42_2$" to --$43_2$--. |
| 9 | 9 | Change "distance e" to --distance $\underline{e}$--. |
| 9 | 14 | Change "film I" to --film 1--. |
| 9 | 17 | Change "$42_2$" to --$43_2$--. |
| 9 | 21 | After "first part" change "45" to --44--. |
| 9 | 23 | After "second part" insert --45--. |

UNITED STATES PATENT AND TRADEMARK OFFICE
CERTIFICATE OF CORRECTION

PATENT NO. : 5,310,106
DATED : 10 May 1994
INVENTOR(S) : Thimon HUBERT et al.

It is certified that error appears in the above-indentified patent and that said Letters Patent is hereby corrected as shown below:

| Column | Line | |
|--------|------|---|
| 9 | 26 | After "roller" delete "40 while the second". |
| 9 | 27 | Delete entire line. |
| 10 | 8 | Change "$42_2$" to --$43_2$--. |
| 10 | 35 | Change "space" to --speed-- |

Signed and Sealed this

Eighth Day of November, 1994

Attest:

BRUCE LEHMAN

Attesting Officer    Commissioner of Patents and Trademarks